US012057650B2

(12) United States Patent
Hibino et al.

(10) Patent No.: US 12,057,650 B2
(45) Date of Patent: Aug. 6, 2024

(54) CONNECTOR AND BOARD UNITY WITH SHIELDING OF THE SIGNAL TERMINAL

(71) Applicant: SUMITOMO WIRING SYSTEMS, LTD., Mie (JP)

(72) Inventors: Takuma Hibino, Mie (JP); Harald Michael Lutsch, Ottrau (DE); Masahiro Karita, Mie (JP); Jumpei Kawahara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 329 days.

(21) Appl. No.: 17/698,853

(22) Filed: Mar. 18, 2022

(65) Prior Publication Data

US 2022/0320771 A1 Oct. 6, 2022

(30) Foreign Application Priority Data

Mar. 30, 2021 (JP) ................................. 2021-058577

(51) Int. Cl.

| | |
|---|---|
| ***H01R 12/71*** | (2011.01) |
| ***H01R 12/58*** | (2011.01) |
| ***H01R 13/629*** | (2006.01) |
| ***H01R 13/6471*** | (2011.01) |
| ***H01R 13/6594*** | (2011.01) |

(52) U.S. Cl.

CPC ........... *H01R 12/716* (2013.01); *H01R 12/58* (2013.01); *H01R 13/629* (2013.01); *H01R 13/6471* (2013.01); *H01R 13/6594* (2013.01)

(58) Field of Classification Search

CPC .... H01R 12/716; H01R 12/58; H01R 13/629; H01R 13/6471; H01R 13/6594; H01R 13/506; H01R 13/6599; H01R 12/724; H01R 13/6581; H01R 12/55; H01R 13/652

See application file for complete search history.

(56) References Cited

U.S. PATENT DOCUMENTS 4,950,170 A * 8/1990 Miller, Jr. .......... H01R 12/7082 439/82
6,776,621 B1 * 8/2004 Dye ........................ H01R 24/50 439/63
6,945,795 B1 * 9/2005 Gross, III .......... H01R 13/6595 439/744

FOREIGN PATENT DOCUMENTS

JP 2021-005445 A 1/2021

* cited by examiner

*Primary Examiner* — Travis S Chambers
(74) *Attorney, Agent, or Firm* — Venjuris, P.C.

(57) ABSTRACT

A connector to be connected to a circuit board includes a signal terminal, a tubular shield portion for covering an outer periphery of an intermediate part of the signal terminal, a housing for holding the signal terminal, and an alignment plate to be joined to the housing. The signal terminal includes a first end part fixed to the housing and a second end part extending from the first end part toward the circuit board. The second end part includes a connecting portion projecting from an end surface of the shield portion. The alignment plate includes a plate body to be arranged between the housing and the circuit board. The plate body has a first region formed with a positioning hole into which the connecting portion is inserted. The conductive portion is formed of conductive rubber or conductive resin.

10 Claims, 9 Drawing Sheets

CONNECTOR AND BOARD UNITY WITH SHIELDING OF THE SIGNAL TERMINAL

CROSS-REFERENCE TO RELATED APPLICATIONS

This application is based on and claims priority from Japanese Patent Application No. 2021-058577, filed on Mar. 30, 2021, with the Japan Patent Office, the disclosure of which is incorporated herein in its entirety by reference.

TECHNICAL FIELD

The present disclosure relates to a connector and a board unit.

BACKGROUND

Japanese Patent Laid-open Publication No. 2021-005445 discloses a board connector with a housing to be fixed to a circuit board, terminal fittings held in the housing and an alignment plate. The terminal fittings extend from the housing toward the circuit board. The terminal fitting includes a board connecting portion to be passed through a through hole of the circuit board. The alignment plate positions the board connecting portions with respect to the circuit board by having the board connecting portions passed therethrough. The alignment plate is formed with positioning holes through which the board connecting portions are passed. The alignment plate is mounted on the housing with the board connecting portions passed through the positioning holes. The alignment plate is made of resin.

SUMMARY

A connector to be connected to a circuit board is required to have improved shielding performance as a communication speed increases.

In recent years, there has been an increasing demand for high-speed communication in an in-vehicle device, and an electrical signal to be transmitted to a circuit board of the in-vehicle device has been speeded up. However, due to a higher speed of the electrical signal, noise caused by an electromagnetic field leaking from a signal terminal of a connector increases. Since the electromagnetic field leaking from the signal terminal causes noise, it induces a reduction in communication quality. Thus, connectors are required to deal with high-speed communication. Recently, the development of connectors supporting the standards of Gigabit Ethernet (registered trademark) with a communication speed of 1 Gbps (gigabits per second) or faster has been required. Particularly, in high-speed communication of 1 Gbps or faster, the influence of noise by an electromagnetic field leaking from a signal terminal becomes significant.

One object of the present disclosure is to provide a connector and a board unit capable of effectively shielding an electromagnetic field particularly leaking from a signal terminal.

This object is solved according to the invention by the features of the independent claims. Particular embodiments of the invention are subject of the dependent claims.

According to one aspect, there is provided a connector to be connected to a circuit board and includes at least one signal terminal, a (particularly substantially tubular) shield portion for at least partly covering an outer periphery of an intermediate part of the signal terminal, a housing for holding and/or positioning the signal terminal, and at least one alignment plate to be joined to the housing, wherein the signal terminal includes a first end part fixed to the housing and a second end part extending from the first end part substantially toward the circuit board, the second end part includes a connecting portion projecting from an end surface of the shield portion, the alignment plate includes a plate body to be arranged between the housing and the circuit board, the plate body has at least one first region formed with at least one positioning hole, the connecting portion being at least partly inserted into the positioning hole, the first region includes at least one conductive portion to be sandwiched between the end surface of the shield portion and the circuit board, the conductive portion at least partially surrounding the connecting portion.

According to a particular embodiment, the conductive portion is formed of or comprises conductive rubber and/or conductive resin.

Particularly, the shield portion is substantially tubular.

According to another aspect of the present invention, there is provided a board unit which includes the connector of the present disclosure and a circuit board.

The connector and the board unit of the present disclosure can effectively shield an electromagnetic field leaking from a signal terminal.

A connector according to an embodiment of the present disclosure particularly is a connector to be connected to a circuit board and includes a signal terminal, a tubular shield portion for covering an outer periphery of an intermediate part of the signal terminal, a housing for holding the signal terminal, and an alignment plate to be joined to the housing, wherein the signal terminal includes a first end part fixed to the housing and a second end part extending from the first end part toward the circuit board, the second end part includes a connecting portion projecting from an end surface of the shield portion, the alignment plate includes a plate body to be arranged between the housing and the circuit board, the plate body has a first region formed with a positioning hole, the connecting portion being inserted into the positioning hole, the first region includes a conductive portion to be sandwiched between the end surface of the shield portion and the circuit board, the conductive portion at least partially surrounding the connecting portion, and the conductive portion is formed of conductive rubber or conductive resin.

Accordingly, the connector can effectively shield an electromagnetic field leaking from the signal terminal. Shielding performance is improved in the connector for the following reason. In the connector, the connecting portion of the signal terminal at least partly is inserted into the positioning hole formed in the plate body of the alignment plate. This positioning hole is formed in the first region of the plate body. With the connecting portion of the signal terminal inserted in the positioning hole, the connecting portion is at least partially surrounded by the conductive portion in the first region. By arranging the conductive portion around the connecting portion, a circumferential part of the connecting portion covered by the conductive portion can be shielded. Since the connector can suppress noise leaking from the connecting portion by the conductive portion, the shielding performance of the connecting portion can be ensured.

Further, when the connector is connected to the circuit board, the first region is sandwiched between the end surface of the shield portion and the circuit board. The conductive portion contacts the end surface of the shield portion and a surface of the circuit board. The conductive portion formed of conductive rubber or conductive resin can be resiliently deformed. Thus, with the first region sandwiched between the end surface of the shield portion and the circuit board, the conductive portion is resiliently deformed. By this resilient deformation, the conductive portion and the end surface of the shield portion are easily held in close contact, and the conductive portion and the circuit board are easily held in close contact. That is, clearances are hardly formed between the conductive portion and the end surface of the shield portion and between the conductive portion and the circuit board. By the close contact of the conductive portion interposed between the end surface of the shield portion and the circuit board with each of the end surface of the shield portion and the circuit board, noise leaking through the clearances can be suppressed.

Besides, since the intermediate part of the signal terminal is covered by the shield portion, the intermediate part of the signal terminal can be shielded.

According to a particular embodiment, the signal terminal is a terminal for high-speed communication of 1 Gbps or faster, and the conductive portion surrounds the connecting portion over an entire periphery.

By the above mode, shielding performance is further improved. By surrounding the connecting portion over the entire periphery by the conductive portion, noise particularly leaking from the connecting portion can be suppressed more. Thus, if the signal terminal is a terminal for high-speed communication, noise leaking particularly from the connecting portion can be more effectively shielded. The above mode can ensure high shielding performance.

Particularly, the connector includes at least one ground terminal arranged substantially side by side with the signal terminal, and the ground terminal includes a first end part connected to the shield portion and a connecting portion projecting from the end surface of the shield portion toward the circuit board.

Accordingly, shielding performance is further improved. By arranging the ground terminal substantially side by side with the signal terminal, the connecting portion of the ground terminal is arranged side by side with the connecting portion of the signal terminal. Noise leaking particularly from the connecting portion of the signal terminal can be suppressed by the ground terminal.

Further particularly, the signal terminal is a press-fit terminal.

Accordingly, in connecting the connector to the circuit board, the signal terminal and the circuit board can be connected without using solder. Since the signal terminal is a press-fit terminal, the connecting portion can be connected only by at least partly being press-fit into a through hole formed in the circuit board. Since solder connection is unnecessary, not only solder-free manufacturing can be realized, but also a manufacturing process can be simplified and manufacturing cost can be reduced.

Further particularly, the connector includes a dielectric between the signal terminal and the shield portion.

Accordingly, electrical insulation between the signal terminal and the shield portion can be ensured by the dielectric.

Further particularly, the dielectric includes a projecting portion projecting from the end surface of the shield portion, and the projecting portion at least partly is inserted into the positioning hole.

Accordingly, electrical insulation between the connecting portion of the signal terminal and the conductive portion in the first region formed with the positioning hole is easily ensured by the projecting portion of the dielectric. By inserting the projecting portion of the dielectric into the positioning hole, the projecting portion is interposed between the connecting portion of the signal terminal and the inner peripheral surface of the positioning hole. Thus, the contact of the connecting portion and the conductive portion can be suppressed.

Further particularly, the connector includes at least one joining portion for holding the plate body on the housing with the conductive portion pressed against or engaged with the end surface of the shield portion.

Accordingly, shielding performance is further improved. By holding the conductive portion pressed against the end surface of the shield portion, it is possible to maintain a state where the conductive portion and the end surface of the shield portion are held in close contact. Since noise leaking through a clearance between the conductive portion and the end surface of the shield portion can be effectively suppressed, high shielding performance can be ensured.

According to the further aspect of the invention, there is provided a board unit which includes the connector according to the above aspect or a particular embodiment thereof, as particularly described above, and a circuit board.

Since the above board unit includes the connector of the present disclosure, an electromagnetic field particularly leaking from the signal terminal can be effectively shielded for the aforementioned reason.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION

A specific example of at least one embodiment of the present disclosure is described below with reference to the drawings. In figures, the same or similar components are denoted by the same reference signs. Note that the present disclosure is not limited to these illustrations and is intended to be represented by claims and include all changes in the scope of claims and in the meaning and scope of equivalents.

SUMMARY

Figure 1:
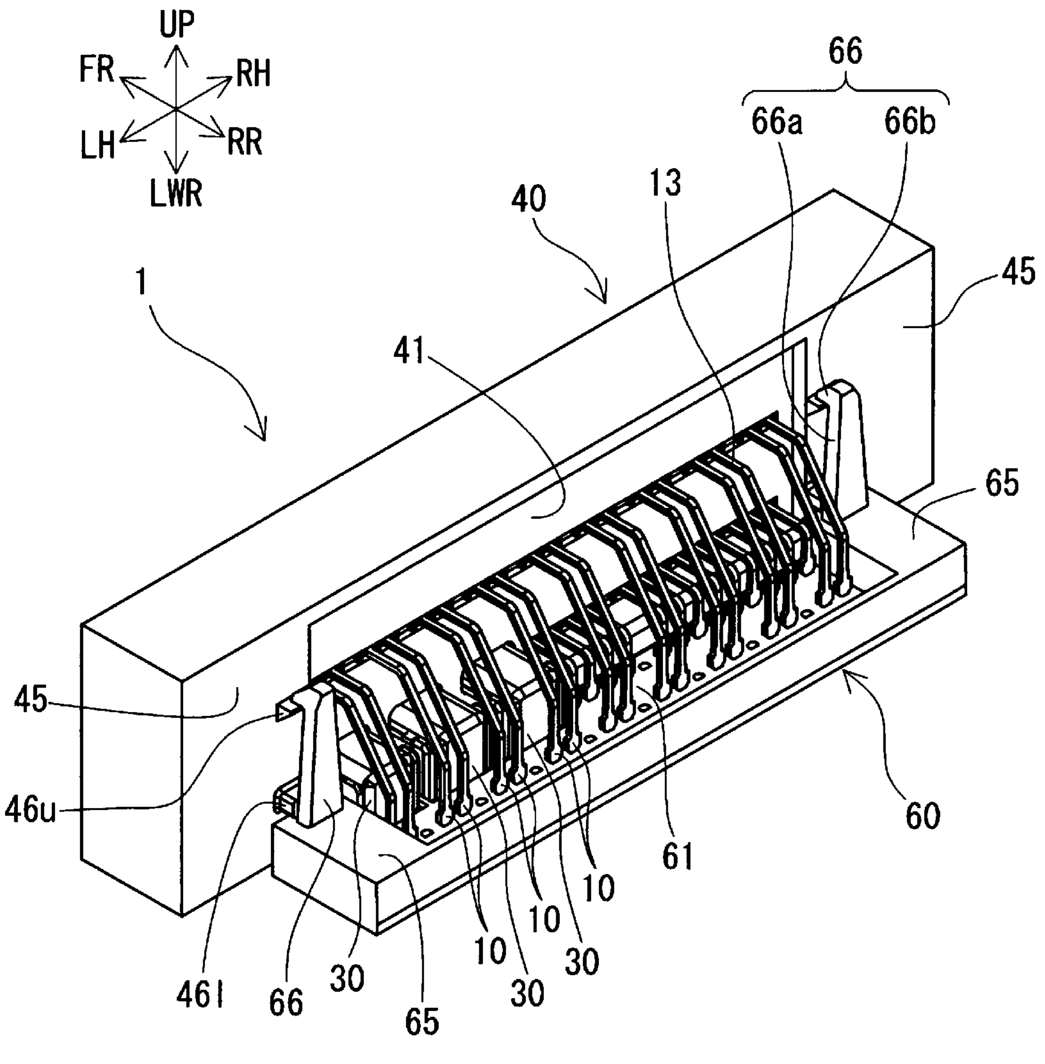
FIG. 1 is a schematic perspective view showing an example of a connector according to an embodiment.
Figure 2:
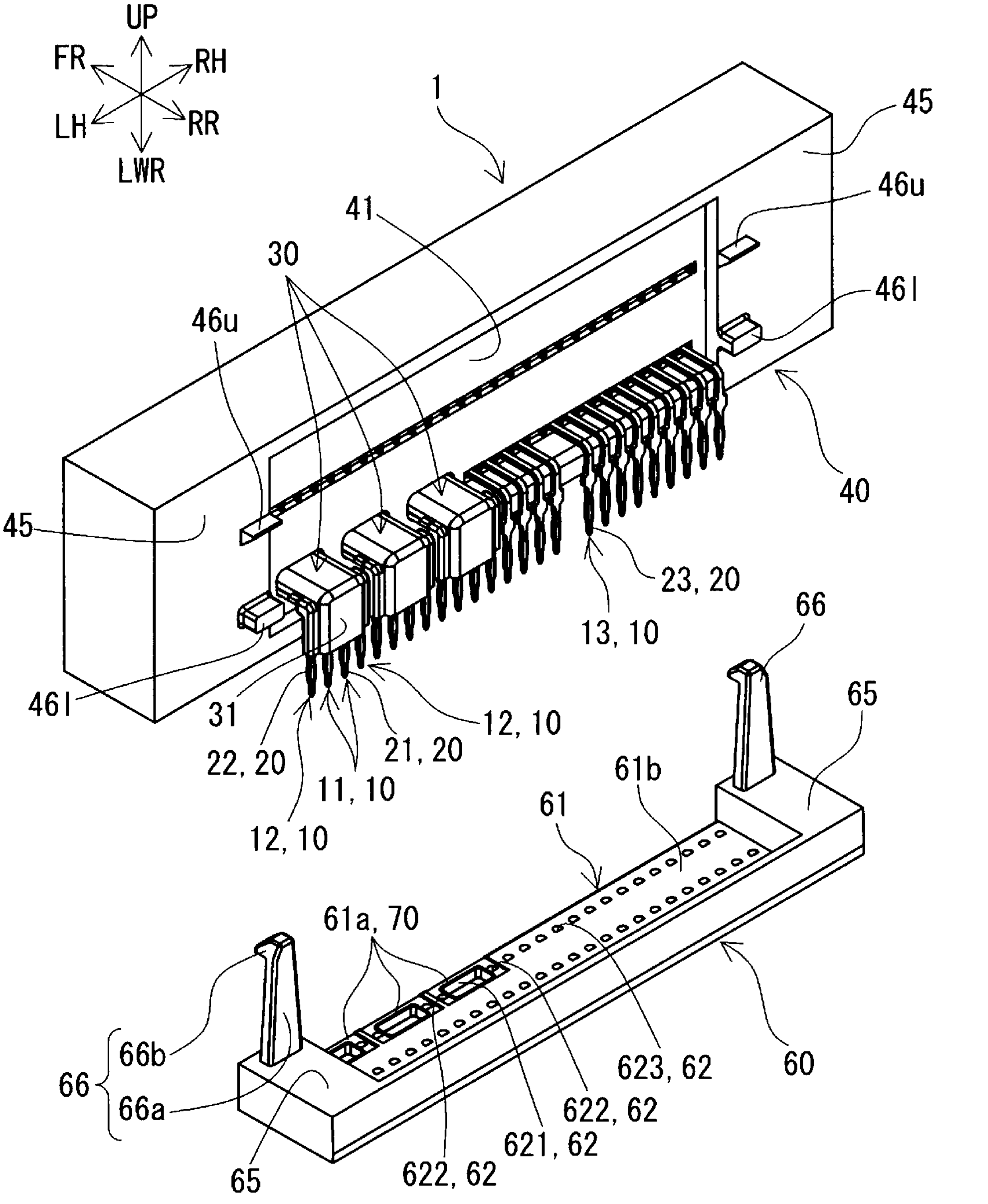
FIG. 2 is a schematic exploded perspective view showing the example of the connector according to the embodiment.
Figure 3:
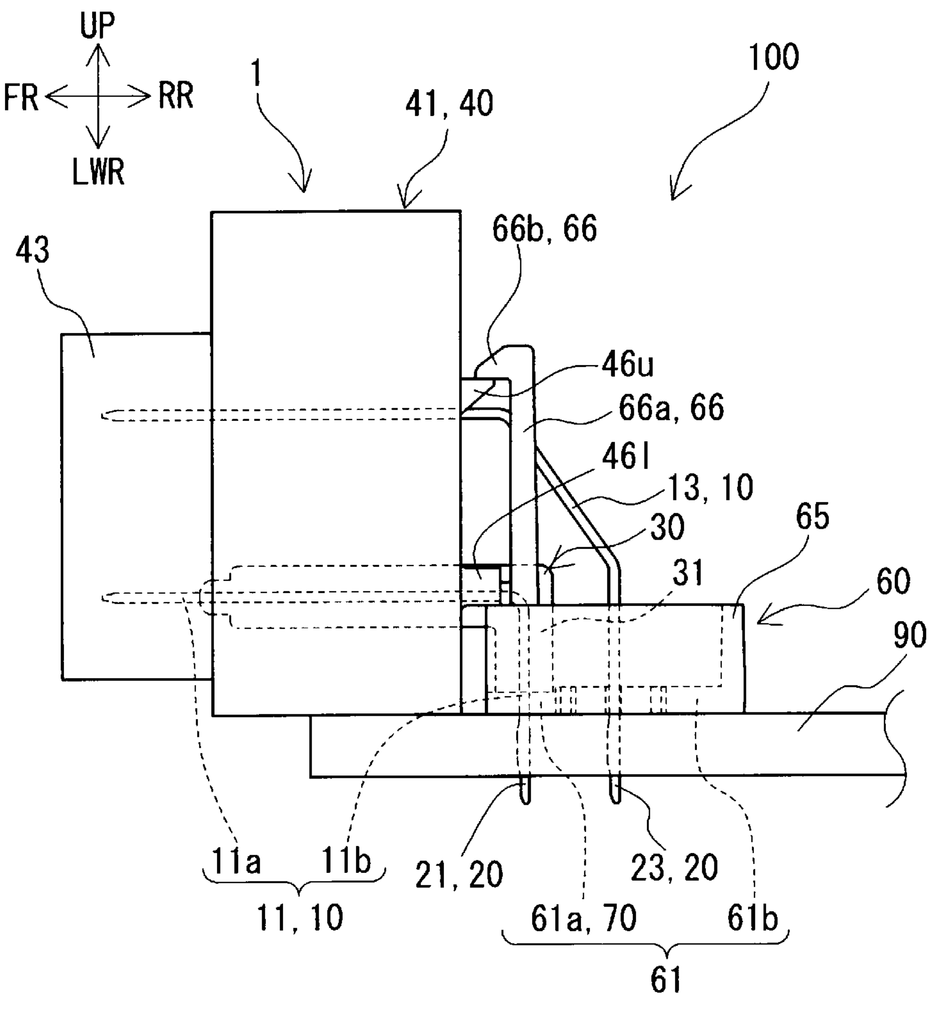
FIG. 3 is a schematic side view showing an example of a board unit according to the embodiment.

With reference to FIGS. 1 to 8, a connector 1 and a board unit 100 according to an embodiment are described. As shown in FIG. 3, the board unit 100 includes the at least one connector 1 and a circuit board 90. The connector 1 is connected or connectable to the circuit board 90. As shown in FIG. 2, the connector 1 includes one or more signal terminals 11, one or more shield portions 31, a housing 40 and at least one alignment plate 60.

Figure 5A:
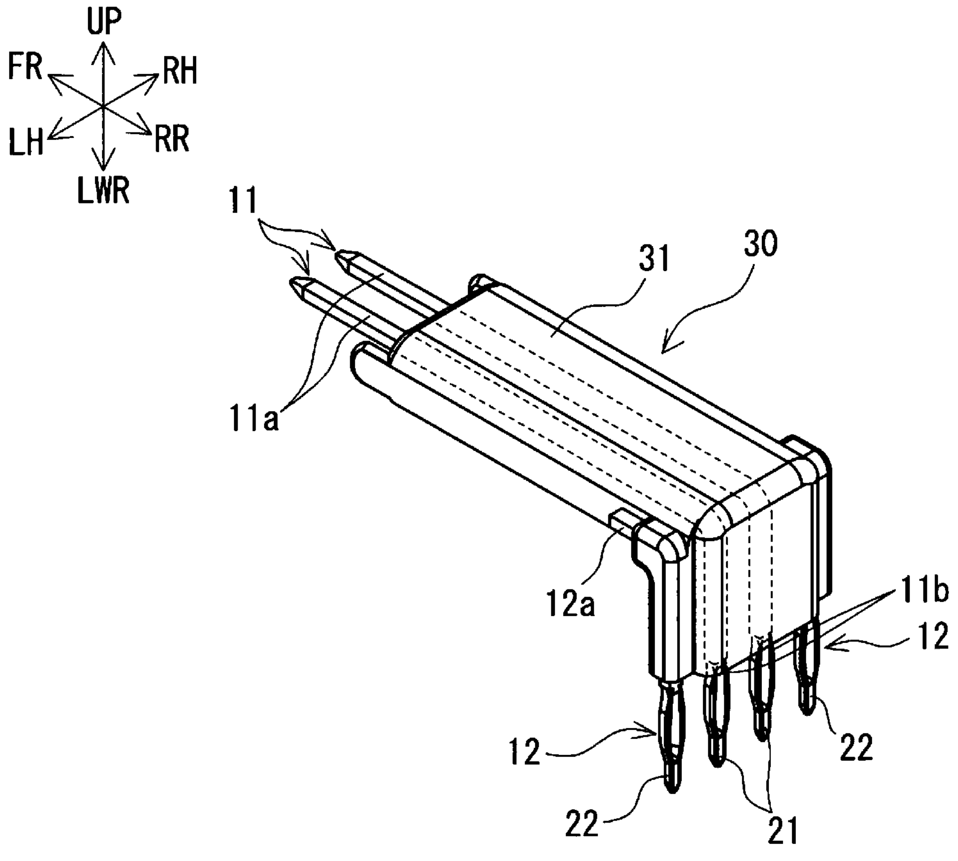
FIG. 5A is a schematic perspective view showing signal terminals and a shield portion provided in the connector according to the embodiment when viewed from an upper side.
Figure 5B:
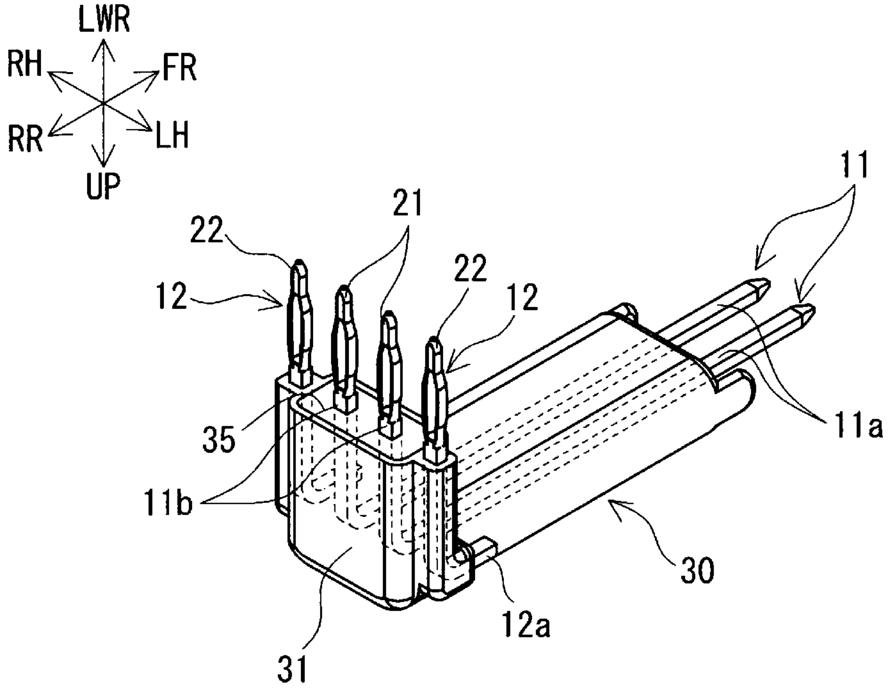
FIG. 5B is a schematic perspective view showing the signal terminals and the shield portion provided in the connector according to the embodiment when viewed from a lower side.

As shown in FIG. 5A, the signal terminal 11 includes a first end part 11*a* and a second end part 11*b*. As shown in FIG. 3, the first end part 11*a* is to be fixed to the housing 40. The second end part 11*b* includes a connecting portion 21 projecting from or at an end surface of the shield portion 31 as shown in FIG. 5B.

As shown in FIG. 2, the alignment plate 60 includes a plate body 61 formed with one or more positioning holes 621. The one or more connecting portions 21 of the signal terminals 11 at least partly are inserted or insertable into the one or more respective positioning holes 621.

In this embodiment, a plurality of terminals 10 including the signal terminals 11 particularly are provided. The plate body 61 particularly is formed with a plurality of positioning holes 62 into which connecting portions 20 of the respective terminals 10 at least partly are to be inserted.

In the following description, a side where the second end parts 11*b* of the signal terminals 11 are arranged with respect to the housing 40 is referred to as a rear side and an opposite side thereof is referred to as a front side in the connector 1. That is, the side of the first end parts 11*a* of the signal terminals 11 is referred to as the front side and the sides of the second end parts 11*b* is referred to as the rear side. A penetrating direction of the signal terminals 11 through the housing 40 is referred to as a front-rear direction. Further, a side where the circuit board 90 is arranged with respect to the connector 1 is referred to as a lower side, and an opposite side thereof is referred to as an upper side. In a plan view of the connector 11 from above, a direction orthogonal to both the front-rear direction and a vertical direction is referred to as a lateral direction. In figures, "FR" denotes a front side of the connector, "RR" denotes a rear side of the connector, "LH" denotes a left side of the connector, "RH" denotes a right side of the connector, "UP" denotes an upper side of the connector, and "LWR" denotes a lower side of the connector.

Figure 6:
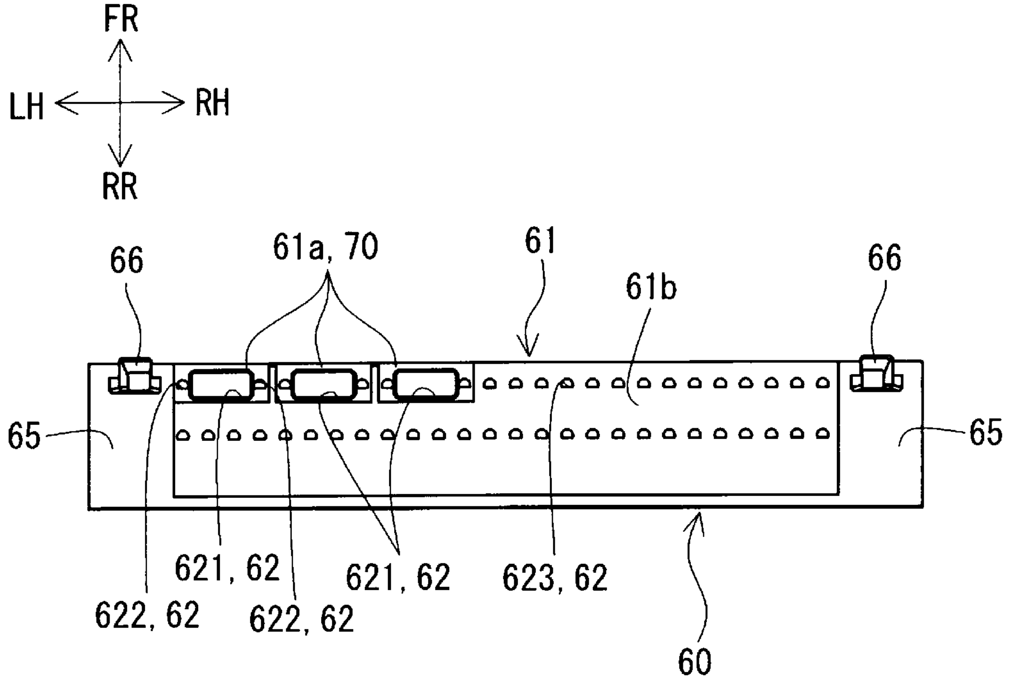
FIG. 6 is a schematic plan view showing an example of an alignment plate provided in the connector according to the embodiment.
Figure 7:
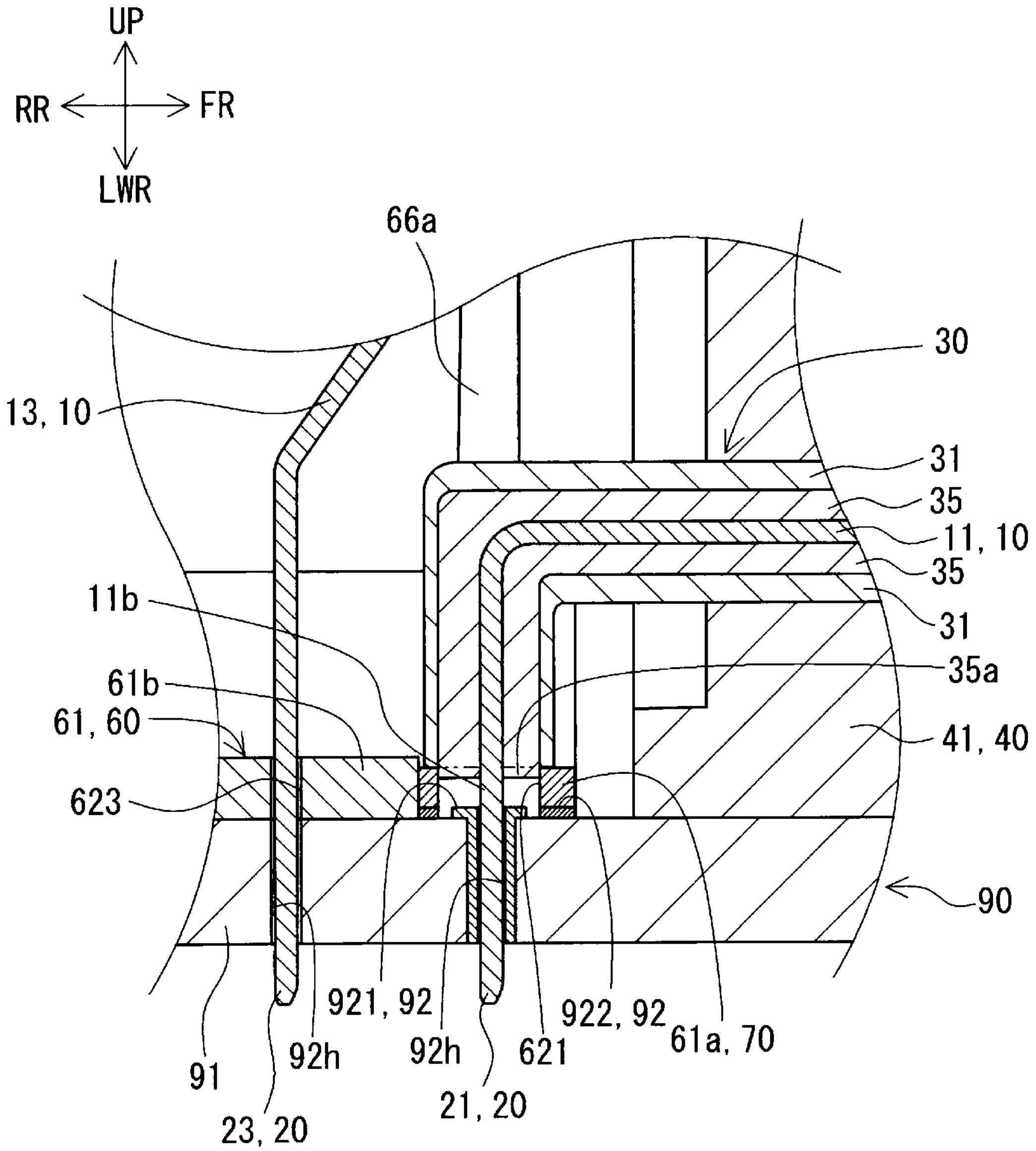
FIG. 7 is a section along VII-VII of FIG. 4 enlargedly showing a main part near connecting portions of the signal terminals.
Figure 8:
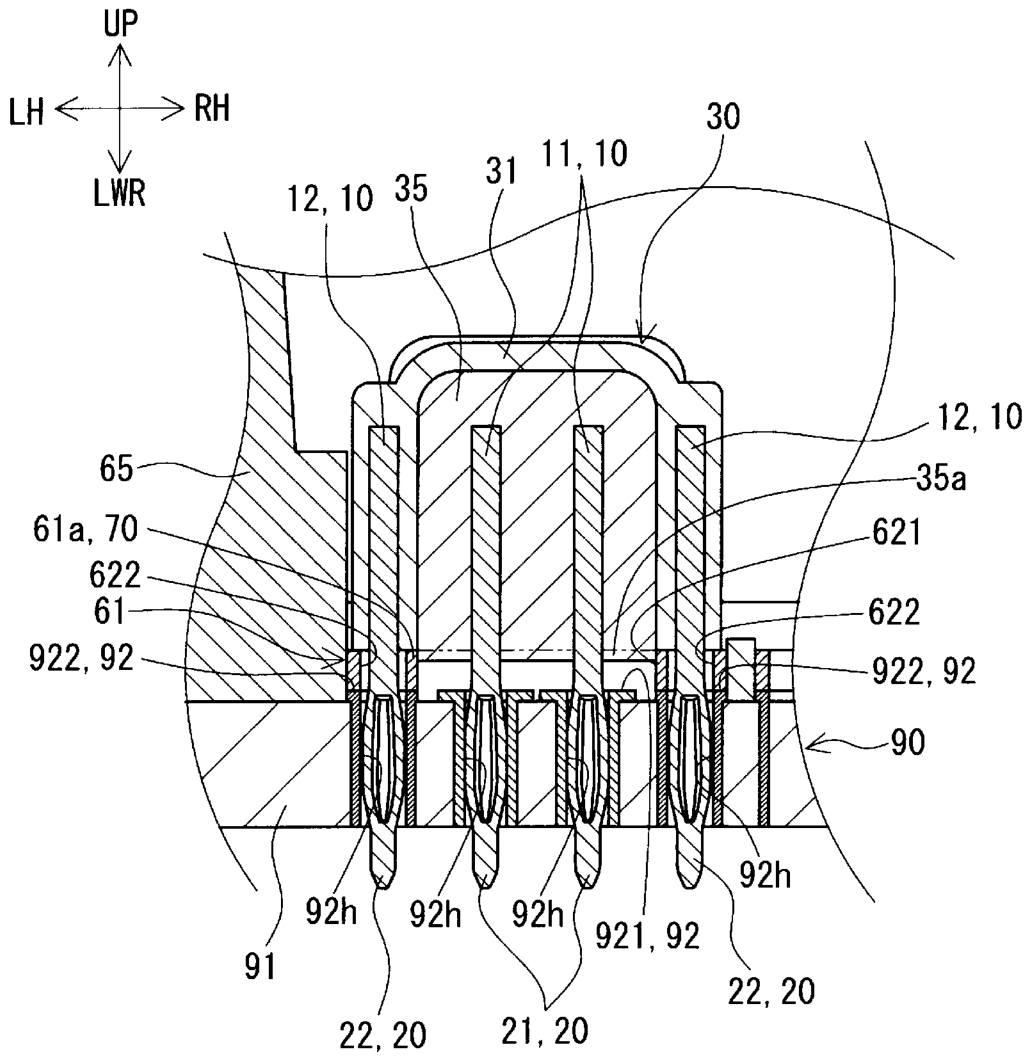
FIG. 8 is a section along VIII-VIII of FIG. 4 enlargedly showing the main part near the connecting portions of the signal terminals.

In the connector 1 of the embodiment, the one or more positioning holes 621 are formed in one or more first regions 61*a* of the plate body 61 in the alignment plate 60 as shown in FIG. 6. The first region 61*a* particularly includes a conductive portion 70 at least partially surrounding the connecting portions 21 of the signal terminals 11 as shown in FIGS. 7 and 8. The conductive portion 70 particularly is formed of or comprises conductive rubber and/or conductive resin.

The configuration of the connector 1 is exemplarily described in detail below.

(Signal Terminals)

The signal terminal 11 particularly is a terminal for communication to which a communication signal is transmitted. A communication speed is, for example, 100 Mbps or faster. The communication speed may be 1 Gbps or faster and further 2.5 Gbps or faster. In this embodiment, the signal terminal 11 is a terminal for high-speed communication of 1 Gbps or faster.

As shown in FIGS. 5A and 5B, the signal terminals 11 particularly are paired. In this embodiment, three pairs of the signal terminals 11 exemplarily are provided as shown in FIG. 2. A pair of the signal terminals 11 particularly are arranged at an interval in the lateral direction. The three pairs of the signal terminals 11 substantially are arranged side by side in the lateral direction.

The signal terminals 11 are made of a conductive material. The conductive material is preferably a metal having a high conductivity. The material of the signal terminals 11 is, for example, copper, copper alloy, stainless steel or the like.

An unillustrated plating layer particularly may be provided on the surface of the signal terminal 11. A material of the plating layer is, for example, tin, tin alloy, silver, silver alloy or the like. An underlayer may be provided between the plating layer and the signal terminal 11. A material of the underlayer is, for example, nickel, nickel alloy or the like.

The signal terminal 11 particularly substantially has a bar-like shape. In this embodiment, as shown in FIG. 5A, the signal terminal 11 is bent at an angle different from 0° or 180°, particularly substantially at 90°, into an L shape.

(First End Parts, Second End Parts)

As shown in FIG. 5A, the signal terminal 11 includes the first end part 11*a* and the second end part 11*b*. The second end part 11*b* includes the connecting portion 21.

As shown in FIG. 3, the first end part 11*a* is to be fixed through the housing 40. The second end part 11*b* extends from the first end part 11*a* toward the circuit board 90 shown in FIG. 3. In this embodiment, the signal terminal 11 particularly is bent downward in a longitudinal intermediate part thereof. Specifically, the first end part 11*a* substantially is along the front-rear direction and/or the second end part 11*b* substantially is along the vertical direction.

As shown in FIG. 3, a tip part exposed from the housing 40, out of the first end part 11*a*, projects from an end surface of the shield portion 31. The tip part of the first end part 11*a* particularly is a front end part of the signal terminal 11. The front end part of the signal terminal 11 particularly is electrically connected or connectable to a signal wire of a communication cable connected to the connector 1. The communication cable is not shown.

(Connecting Portions)

As shown in FIG. 5B, the connecting portion 21 projects from an end surface of the shield portion 31. That is, the connecting portion 21 substantially is not covered by the shield portion 31. The connecting portion 21 is connected or connectable to the circuit board 90 shown in FIG. 3 through the positioning hole 621 formed in the plate body 61 of the alignment plate 60.

(Shield Portions)

As shown in FIGS. 5A and 5B, the shield portion 31 at least partly covers the outer peripheries of intermediate parts of the signal terminals 11. The shield portion 31 particularly substantially has a tubular shape. The shield portion 31 of this embodiment particularly is bent at an angle different from 0° or 180°, particularly substantially at 90°, into an L shape substantially in conformity with the bent shape of the signal terminals 11.

The shield portion 31 has a shielding property of substantially shielding noise particularly leaking from the signal terminals 11. In this embodiment, the shield portion 31 collectively covers around a pair of the signal terminals 11. One shield portion 30 particularly is constituted by the pair of signal terminals 11 and the shield portion 31.

(Dielectrics)

In this embodiment, at least one dielectric 35 at least partly is provided between the signal terminals 11 and the shield portion 31 as shown in FIG. 5B. The dielectric 35 ensures electrical insulation between the signal terminals 11 and the shield portion 31 by being at least partly interposed between the signal terminals 11 and the shield portion 31.

The dielectric 35 particularly is designed to match impedance at a frequency of a communication signal transmitted to the signal terminals 11.

In this embodiment, the dielectric 35 particularly is filled between the pair of signal terminals 11 and the shield portion 31.

As shown in FIGS. 7 and 8, the dielectric 35 may include at least one projecting portion 35*a* projecting from the end surface of the shield portion 31. The projecting portion 35*a* at least partly is inserted or insertable into the positioning hole 621 formed in the plate body 61.

A projection amount of the projecting portion 35*a* is, for example, about 0.5 mm. An upper limit of the projection amount of the projecting portion 35*a* particularly is equal to or less than a depth of the positioning hole 621. The projection amount of the projecting portion 35*a* is a length projecting from the end surface of the shield portion 31. The projection amount of the projecting portion 35*a* is substantially equal to a length of the projecting portion 35*a* to be inserted into the positioning hole 621. A depth of the positioning hole 621 is equal to a thickness of the first region 61*a* formed with the positioning hole 621, out of the plate body 61. The projection amount of the projecting portion 35*a* is, for example, about 50% or more and 100% or less of the depth of the positioning hole 621.

If the dielectric 35 includes the projecting portion 35*a*, the projecting portion 35*a* at least partly is to be inserted into the positioning hole 621 with the connecting portions 21 of the signal terminals 11 inserted in the positioning hole 621. By at least partly interposing the projecting portion 35*a* between the connecting portions 21 and the inner peripheral surface of the positioning hole 621, the contact of the connecting portions 21 and the inner peripheral surface of the positioning hole 621 can be suppressed.

Since the contact of the connecting portions 21 with the conductive portion 70 in the first region 61*a* where the positioning hole 621 is formed particularly can be suppressed by the projecting portion 35*a*, electrical insulation between the connecting portions 21 and the conductive portion 70 is easily ensured.

If the projection amount of the projecting portion 35*a* satisfies at least one of about 0.5 mm or more and about 50% or more of the depth of the positioning hole 621, the contact of the connecting portions 21 and the inner peripheral surface of the positioning hole 621 can be effectively suppressed by the projecting portion 35*a*. That is, electrical insulation between the connecting portions 21 and the conductive portion 70 can be ensured.

(Ground Terminals)

As shown in FIGS. 2 and 5A, one or more ground terminals 12 are provided in this embodiment. The one or more ground terminals 12 particularly are arranged substantially side by side with the signal terminals 11. The ground terminals 12 suppress noise particularly leaking from the connecting portions 21 of the signal terminals 11. In this embodiment, one ground terminal 12 specifically is provided on each of both left and right sides of the pair of signal terminals.

The ground terminals 12 are made of a conductive material. The aforementioned material of the signal terminals 11 particularly can be utilized as the material of the ground terminals 12. Similarly to the signal terminals 11, the ground terminals 12 particularly may include a plating layer and an underlayer described above.

The ground terminal 12 particularly substantially has a rod- or bar-like shape. In this embodiment, the ground terminal 12 is bent at an angle different from 0° or 180°, particularly substantially at 90°, into an L shape as shown in FIG. 5A.

(First End Parts, Connecting Portions)

As shown in FIG. 5A, the ground terminal 12 includes a first end part 12*a* and a connecting portion 22. The first end part 12*a* is to be connected to the shield portion 31.

The connecting portion 22 particularly substantially projects from the end surface of the shield portion 31 toward the circuit board 90 shown in FIG. 3.

In this embodiment, the first end parts 12*a* of the respective ground terminals 12 particularly are connected to both left and right sides of the shield portion 31. The first end parts 12*a* are embedded in the shield portion 31. The first end parts 12*a* do not reach the housing 40.

In this embodiment, the ground terminal 12 is bent at an angle different from 0° or 180°, particularly substantially at 90°, downward at a longitudinal intermediate part thereof. Specifically, the first end part 12*a* substantially is along the front-rear direction, and the connecting portion 22*a* is along the vertical direction.

The connecting portion 22 particularly is connected to the circuit board 90 through a positioning hole 622 formed in the plate body 61 of the alignment plate 60 shown in FIG. 2.

The number and arrangement of the ground terminals 12 can be appropriately selected. For example, the connecting portions 22 of the ground terminals 12 may be arranged not only on both left and right sides of the connecting portions 21, but also on front and rear sides of the connecting portions 21 to surround the connecting portions 21 of the signal terminals 11.

(Other Terminals)

In this embodiment, one or more other terminals 13 particularly are provided as the plurality of terminals 10 besides the signal terminal(s) 11 and the ground terminal(s) 12 as shown in FIG. 2. The one or more other terminals 13 are, for example, power supply terminals, control terminals and the like.

Power for operating the circuit board 90 shown in FIG. 3 particularly are supplied to the power supply terminal(s).

Control signals for controlling the circuit board 90 particularly are transmitted to the control terminal(s).

Out of the plurality of terminals 10, some of the other terminals 13 are not shown in FIG. 2.

The one or more other terminals 13 are configured similarly to the aforementioned signal terminals 11. However, the one or more other terminals 13 particularly differ from the signal terminals 11 in being not covered by the shield portions 31.

The other terminal 13 includes a first end part to be fixed through the housing 40 and a second end part extending from the first end part toward the circuit board 90 shown in FIG. 3, similarly to the signal terminal 11.

The second end part particularly includes a connecting portion 23. The connecting portion 23 is connected to the circuit board 90 through a positioning hole 623 formed in the plate body 61 of the alignment plate 60.

A tip part of the first end part of the other terminal 13, i.e. a front end part of the terminal 13, particularly is exposed from the housing 40. The front end part of each terminal 13 particularly is electrically connected or connectable to each wire of the corresponding communication cable. For example, if the terminal 13 is the power supply terminal, a power supply wire of the communication cable is electrically connected to the terminal 13. If the terminal 13 is the control terminal, a control wire of the communication cable is electrically connected to the terminal 13.

The signal terminals 11, the ground terminal(s) 12 and the other terminal(s) 13 may be collectively called the "terminals 10" below. The connecting portion(s) 21 of the signal terminal(s) 11, the connecting portion(s) 22 of the ground terminal(s) 12 and/or the connecting portion(s) 23 of the other terminal(s) 13 may be collectively and merely called "connecting portions 20" below.

In this embodiment, any of the plurality of terminals 10 including the signal terminals 11 particularly is a press-fit terminal. If the terminal 10 is a press-fit terminal, the connecting portion 20 includes a press-fit portion. The press-fit portion is provided in a part of the connecting portion 20 to be at least partly inserted into a through hole 92*h* formed in the circuit board 90 as shown in FIGS. 7 and 8.

The press-fit portion particularly substantially is resiliently deformed by being press-fit into the through hole 92*h*. By the contact of the press-fit portion with the inner peripheral surface of the through hole 92*h*, the connecting portion 20 and the through hole 92*h* are electrically connected. That is, each terminal 10 is electrically connected to the circuit board 90.

(Housing)

As shown in FIG. 2, the housing 40 holds the one or more signal terminals 11. In this embodiment, the housing 40 particularly holds the plurality of terminals 10 including the signal terminals 11. The housing 40 includes at least one terminal holding portion 41 and/or one or more side wall portions 45. The housing 40 particularly is a resin molded body.

(Terminal Holding Portion)

The terminal holding portion 41 is a part for holding the one or more, particularly the plurality of terminals 10. The terminal holding portion 41 particularly substantially has a block shape. In this embodiment, the terminal holding portion 41 has a rectangular parallelepiped shape long in the lateral direction.

Figure 4:
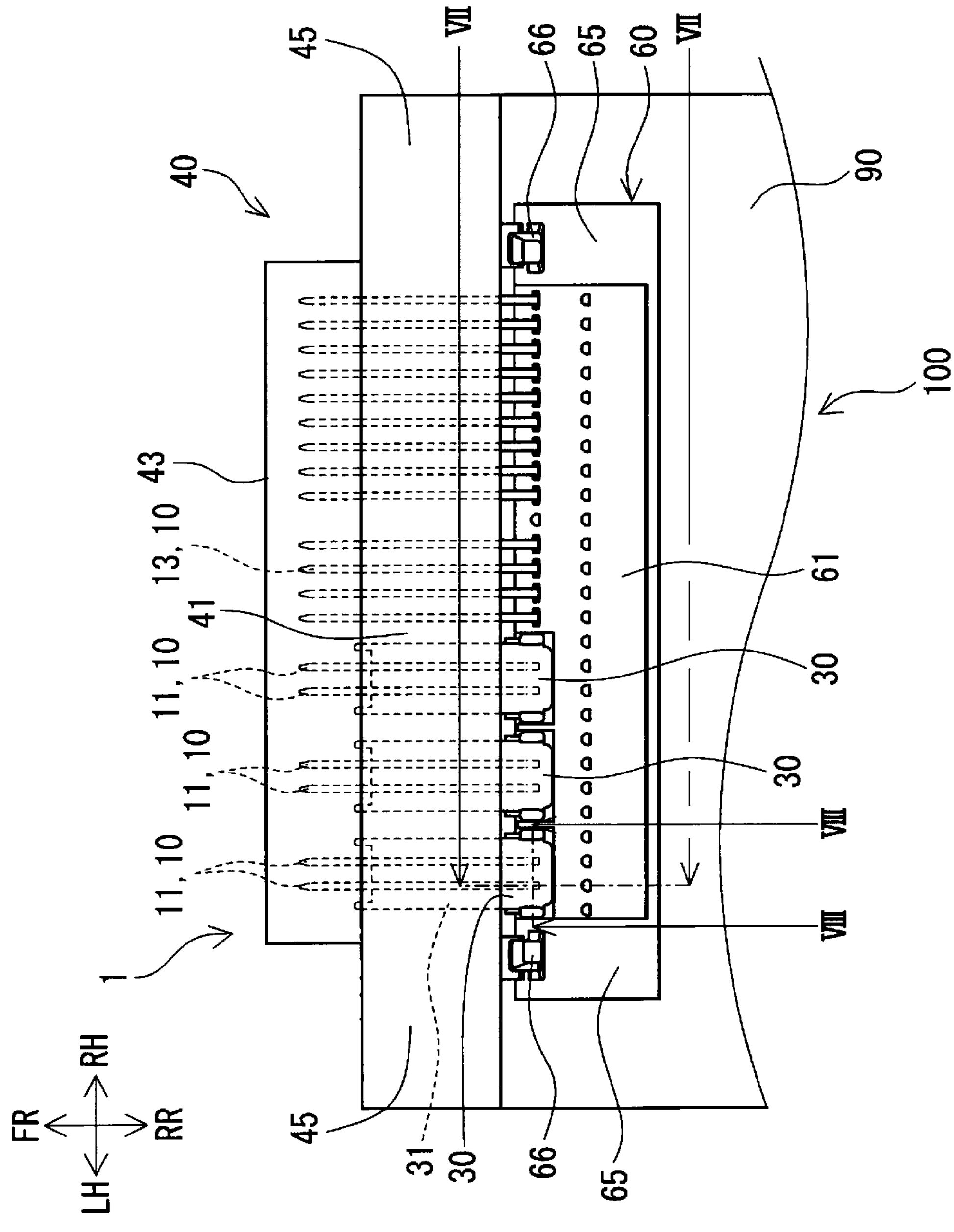
FIG. 4 is as schematic plan view showing the example of the board unit according to the embodiment.

As shown in FIGS. 3 and 4, a receptacle 43 particularly is provided on or near a front side of the terminal holding portion 41. The receptacle 43 particularly is integrally molded to the terminal holding portion 41. The receptacle 43 substantially is formed into a tubular shape to at least partly surround the front end parts of the respective terminals 10 substantially exposed from the terminal holding portion 41.

The receptacle 43 particularly projects from or at the front surface of the terminal holding portion 41.

A connector on the communication cables at least partly is to be fit or inserted into the receptacle 43.

In FIG. 4, out of the plurality of terminals 10, some of the other terminals 13 are not shown.

(Side Wall Portions)

The one or more side wall portions 45 are provided on a lateral side, particularly on both left and right sides of the terminal holding portion 41. The side wall portions 45 are parts extended laterally (to left and right) from the terminal holding portion 41. The terminal holding portion 41 and the side wall portions 45 particularly are integrally or unitarily molded.

As shown in FIGS. 2 and 3, one or more upper ribs 46*u* and/or one or more lower ribs 461 are provided on one or more rear sides of the side wall portion(s) 45. The upper and/or lower rib(s) 46*u*, 461 project from the rear surface(s) of the side wall portion(s) 45. The upper and lower ribs 46*u*, 461 particularly are arranged at an interval in the vertical direction. The upper and/or lower rib(s) 46*u*, 461 particularly are integrally or unitarily molded to the side wall portion(s) 45. The upper and/or lower rib(s) 46*u*, 461 particularly are for joining the alignment plate 60 to the housing 40. Functions of the upper and lower ribs 46*u*, 461 are described in detail in section "Joining Portion" to be described later.

(Alignment Plate)

As shown in FIG. 1, the alignment plate 60 is to be joined to the housing 40. The alignment plate 60 particularly is a member for positioning the connecting portion(s) 20 of the respective terminal(s) 10 shown in FIG. 2 with respect to the circuit board 90 shown in FIG. 3. In this embodiment, the alignment plate 60 particularly includes the plate body 61 and one or more supporting portions 65.

(Plate Body)

The plate body 61 is to be arranged between the housing 40 and the circuit board 90. Specifically, the plate body 61 is located at intermediate position(s) of path(s) of the terminal(s) 10 from the housing 40 to the circuit board 90.

In the case of this embodiment, the plate body 61 particularly is arranged behind the terminal holding portion 41. As shown in FIG. 2, the plate body 61 is formed with the one or more positioning holes 621 into which the one or more connecting portions 21 of the one or more signal terminals 11 at least partly are inserted or insertable.

In this embodiment, the plate body 61 particularly is formed with a plurality of positioning holes 62 including the positioning holes 621. Besides the positioning holes 621, the plurality of positioning holes 62 include the one or more positioning holes 622 into which the one or more connecting portions 22 of the respective one or more ground terminals 12 at least partly are inserted or insertable and/or the one or more positioning holes 623 into which the one or more connecting portions 23 of the respective one or more other terminals 13 at least partly are inserted or insertable.

The plate body 61 particularly substantially has a plate-like shape. In this embodiment, the plate body 61 particularly substantially has a rectangular shape long in the lateral direction. A thickness of the plate body 61 is, for example, about 1 mm or more and/or about 2 mm or less.

(First Region)

As shown in FIG. 6, the plate body 61 has the first region(s) 61*a*. The first regions 61*a* are regions where the one or more positioning holes 621 are formed. The one or more positioning holes 622 particularly are also formed in the first regions 61*a*.

In this embodiment, a part of the plate body 61 particularly is constituted by the first regions 61*a*. The plate body 61 includes the first regions 61*a* and a second region 61*b* excluding the first regions 61. The second region 61*b* particularly is a region where the positioning holes 623 are formed.

In this embodiment, the first region 61*a* particularly substantially is a rectangular block in a plan view. As shown in FIG. 2, the first region 61*a* is to be arranged at a position corresponding to the position of the aforementioned shield module 30.

The plate body 61 particularly is provided with the first regions 61*a*, the number of which corresponds to the number of the shield modules 30. In this embodiment, three first regions 61*a* particularly are arranged substantially side by side in the lateral direction. Adjacent ones of the first regions

61*a* may be linked or may not be linked. In this embodiment, adjacent ones of the first regions 61*a* are not linked to each other.

As shown in FIGS. 7 and 8, when the connector 1 is to be connected to the circuit board 90, i.e. when the board unit 100 is configured, the first regions 61*a* at least partly are sandwiched between the end surfaces of the shield portions 31 and the circuit board 90.

The one or more first regions 61*a* are to be in contact with the end surface(s) of the shield portion(s) 31 and/or the surface of the circuit board 90. A circuit pattern 92 to be described later particularly is formed on the surface of the circuit board 90.

(Conductive Portions)

The first region 61*a* includes the conductive portion 70. The conductive portion 70 surrounds at least parts of the connecting portion(s) 21 at least partly inserted into the positioning hole 621. The conductive portion 70 has a shielding property of shielding an electromagnetic field particularly leaking from the connecting portions 21. In this embodiment, the entire first region 61*a* particularly is constituted by the conductive portion 70. That is, the conductive portion 70 is arranged to surround the connecting portions 21 over entire periphery.

A material of the conductive portion 70 particularly is or comprises conductive rubber and/or conductive resin having conductivity and flexibility. The conductive rubber particularly is a composite material in which a conductive filler (such as metal particles) is dispersed in a rubber material. The conductive resin particularly is a composite material in which a conductive filter is dispersed in a resin material. The rubber material is, for example, natural rubber, synthetic rubber or the like.

The conductive rubber or conductive resin is softer than metals. The conductive portion 70 formed of or comprising the conductive rubber and/or conductive resin can be resiliently deformed. As shown in FIGS. 7 and 8, the conductive portion 70 at least partly is compressed with the first region 61*a* sandwiched between (particularly the end surface of) the shield portion 31 and the circuit board 90. By the resilient deformation of the conductive portion 70, the conductive portion 70 is easily held in close contact with both (the end surface of) the shield portion 31 and the circuit board 90. That is, a clearance is hardly formed between the conductive portion 70 and the end surface of the shield portion 31 and between the conductive portion 70 and the circuit board 90.

A hardness of the conductive portion 70 is, for example, about 20 or more and/or about 70 or less. The hardness is a Shore A hardness. If the hardness of the conductive portion 70 is about 20 or more, the excessive deformation of the conductive portion 70 is easily suppressed. If the hardness of the conductive portion 70 is about 70 or less, the resilient deformability of the conductive portion 70 is easily ensured. Thus, the conductive portion 70 is easily held in close contact with each of (the end surface of) the shield portion 31 and the circuit board 90.

A compression rate of the conductive portion 70 is, for example, about 70% or more and/or about 90% or less. The compression rate of the conductive portion 70 is a percentage of a thickness t1 after compression to a thickness t0 before compression of the conductive portion 70, i.e. [t1/t0]×100. The smaller the value of the compression rate, the larger the compression amount of the conductive portion 70. The larger the value of the compression rate, the smaller the compression amount of the conductive portion 70. If the compression rate of the conductive portion 70 is about 70% or more, it is possible to suppress the generation of an excessive compressive stress in the conductive portion 70. If the compression rate of the conductive portion 70 is about 90% or less, close contact by the compressive deformation of the conductive portion 70 is easily ensured.

A part of the plate body 61 except the conductive portions 70 is formed of electrically insulating resin. In this embodiment, in the plate body 61 shown in FIG. 6, the first regions 61*a* constituted by or comprised of the conductive portions 70 particularly are made of or comprise conductive rubber and/or conductive resin and the second region 61*b* is made of or comprises resin. The first and second regions 61*a*, 61*b* are integrally molded. Two-color molding or the like can be, for example, utilized as a method for integrally molding the first and second regions 61*a*, 61*b* different in material. Unlike this embodiment, the plate body 61 may be configured by, after the first and second regions 61*a*, 61*b* are respectively molded, assembling the first and second regions 61*a*, 61*b*.

(Supporting Portions)

As shown in FIGS. 2 and 6, the one or more supporting portions 65 are provided on or near a lateral side (particularly both left and right sides) of the plate body 61. The supporting portion(s) 65 particularly is/are arranged behind the side wall portion(s) 45. The supporting portions 65 particularly have a block shape. The supporting portion(s) 65 particularly is/are thicker than the plate body 61. The plate body 61 and the supporting portions 65 particularly are integrally or unitarily molded.

As shown in FIGS. 2 and 3, the supporting portion 65 particularly is provided with at least one joining portion 66 for holding the plate body 61 on the housing 40. The joining portion 66 particularly is integrally or unitarily molded to the supporting portion 65.

(Joining Portions)

In this embodiment, the one or more joining portions 66 are configured to hold the plate body 61 with the first region(s) 61*a* pressed against the end surfaces of the shield portion(s) 31.

The joining portion 66 particularly includes an arm portion 66*a* fixed to the supporting portion 65 and/or a hook-shaped hooking portion 66*b* on or near the tip of the arm portion 66*a*. The arm portion 66*a* substantially extends upward from the upper surface of the supporting portion 65.

As shown in FIGS. 2 and 3, the arm portion 66*a* substantially extends in the vertical direction along or adjacent to the rear surface of the side wall portion 45. The hooking portion 66*b* substantially projects toward the side wall portion 45 from or near the tip of the arm portion 66*a*. The hooking portion 66*b* is to be hooked to the upper rib 46*u*. The tip of the arm portion 66*a* is an end part distant from the supporting portion 65, i.e. an upper end part.

With the connecting portion(s) 21 of the signal terminal(s) 11 at least partly inserted in the positioning hole(s) 621 (FIG. 2), the hooking portion(s) 66*b* particularly is/are to be hooked to the upper rib(s) 46*u* as shown in FIG. 3. In this way, the plate body 61 is held with (particularly the end surface(s) of) the shield portion(s) 31 held in contact with the first region(s) 61*a* and/or the first region(s) 61*a* pressed against (particularly the end surface(s) of) the shield portion(s) 31. In this way, a state where the conductive portions 70 and (the end surface(s) of) the shield portion(s) 31 are in close contact can be maintained.

Further, particularly by stopping the upper surface(s) of the supporting portion(s) 65 in contact with the lower rib(s) 461, an upward movement of the plate body 61 is restricted so that the first region(s) 61*a* is/are not excessively pressed against the end surfaces of the shield portion(s) 31. In this way, the plate body 61 is positioned in the vertical direction.

(Circuit Board)

As shown in FIG. 3, the connector 1 is connected or connectable to the circuit board 90. As shown in FIGS. 7 and 8, the circuit board 90 particularly includes a board 91 and the at least one circuit pattern 92 formed on the board 91. In this embodiment, the circuit board 90 particularly is a printed circuit board. The circuit board 90 is formed with a plurality of through holes corresponding to the plurality of terminals 10 shown in FIG. 2. The connecting portion 20 of each terminal 10 at least partly is inserted into each through hole.

<Board>

The board 91 is made of or comprises electrically insulating resin. A material of the board 91 is, for example, a glass epoxy resin.

<Circuit Pattern>

The circuit pattern 92 particularly includes a signal circuit 921 and a ground circuit 922. The signal circuit 921 and the ground circuit 922 are provided with one or more through holes 92*h*. As shown in FIG. 7, by at least partly inserting the connecting portion 21 of the signal terminal 11 into the through hole 92*h* of the signal circuit 921, the signal terminal 11 and the signal circuit 921 are electrically connected. As shown in FIG. 8, by at least partly inserting the connecting portion 22 of the ground terminal 12 into the through hole 92*h* of the ground circuit 922, the ground terminal 12 and the ground circuit 922 are electrically connected.

The ground circuit 922 particularly is formed on a surface of the circuit board 90 substantially facing the conductive portion(s) 70. When the connector 1 is connected to the circuit board 90, the conductive portion(s) 70 and the ground circuit 922 are electrically connected by the contact of the conductive portion(s) 70 and the ground circuit 922. Then, the shield portions 31 and the ground circuit 922 are electrically connected via the conductive portion(s) 70.

Although not shown in this embodiment, various circuits such as a power supply circuit and a control circuit particularly are formed as the circuit pattern 92 besides the signal circuit 921 and the ground circuit 922. Each circuit is provided with one or more through holes.

I order to effectively shield an electromagnetic field leaking from a signal terminal, there is provided a connector 1 to be connected to a circuit board 90 which includes at least one signal terminal 11, a (particularly substantially tubular) shield portion 31 for at least partly covering an outer periphery of an intermediate part of the signal terminal 11, a housing 40 for holding or positioning the signal terminal 11, and/or at least one alignment plate 60 to be directly or indirectly joined to the housing 40. The signal terminal 11 includes a first end part 11*a* to be fixed to the housing 40 and a second end part 11*b* extending from the first end part 11*a* toward the circuit board 90. The second end part 11*b* includes a connecting portion 22 projecting from an end surface of the shield portion 31. The alignment plate 60 includes a plate body 61 to be arranged between the housing 40 and the circuit board 90. The plate body 61 has a first region 61*a* formed with a positioning hole 621 into which the connecting portion 22 is inserted. The first region 61*a* includes a conductive portion 70 to be at least partly sandwiched between the end surface of the shield portion 31 and the circuit board 90 and configured to at least partially surround the connecting portion 22. The conductive portion 70 particularly is formed of conductive rubber or conductive resin.

Effects

The connector 1 and the board unit 100 of this embodiment have the following effects.

Main Effects

The connector 1 and the board unit 100 of this embodiment can effectively shield an electromagnetic field particularly leaking from the signal terminals 11 for the following reason.

In the connector 1, the plate body 61 of the alignment plate 60 is formed with the one or more positioning holes 621 into which the respective one or more connecting portions 21 of the signal terminal(s) 11 at least partly are inserted. The one or more positioning holes 621 are formed in the one or more first regions 61*a* of the plate body 61. When the one or more connecting portions 21 of the one or more signal terminals 11 at least partly are inserted into the one or more positioning holes 621, the connecting portion(s) 21 at least partly is/are surrounded by the conductive portion(s) 70 of the first region(s) 61*a*. Circumferential part(s) of the connecting portion(s) 21 covered by the conductive portion(s) 70 can be shielded.

Particularly, if the connecting portion(s) 21 is/are surrounded over the substantially entire periphery as in this embodiment, noise leaking particularly from the connecting portion(s) 21 can be suppressed more. Even if the signal terminal(s) 11 particularly is/are terminal(s) for high-speed communication, high shielding performance supporting the Gigabit Ethernet standards can be ensured since the leakage of the noise from the connecting portion(s) 21 can be more effectively shielded.

If the signal terminal(s) 11 particularly is/are terminals for communication, e.g. below 1 Gbps, the conductive portion(s) 70 particularly may be arranged to partially circumferentially surround the connecting portion(s) 21. In the case of arranging the conductive portion(s) 70 partially around the connecting portion(s) 21, the conductive portion(s) 70 may be arranged around circumferential parts of the connecting portion(s) 21 largely affected by noise leaking from the connecting portion(s) 21.

In this embodiment, as shown in FIG. 7, the one or more connecting portions 23 of the other terminal(s) 13 particularly are arranged behind the connecting portion(s) 21 of the signal terminal(s) 11, but not in front of the connecting portion(s) 21. In this case, if noise leaks rearward from the connecting portion(s) 21, the other terminal(s) 13 are largely affected by the noise. Accordingly, the rear part(s) of the connecting portion(s) 21 particularly is/are surrounded by the conductive portion(s) 70 so that noise does not leak rearward from the connecting portion(s) 21. On the other hand, even if noise leaks forward from the connecting portion(s) 21, an influence caused by the noise is small since the connecting portion(s) 23 of the other terminal(s) 13 particularly is/are not arranged in front of the connecting portion(s) 21. Thus, the front part(s) of the connecting portion(s) 21 may not be surrounded by the conductive portion(s) 70.

However, if the one or more signal terminals 11 particularly are terminals for high-speed communication of 1 Gbp or faster, particularly 2.5 Gbps or faster, a wavelength of an electromagnetic field leaking from the signal terminal(s) 11 is short. The electromagnetic field having a short wavelength has such a property as to spread around from the parts not surrounded by the conductive portion(s) 70. Therefore, if the one or more signal terminals 11 are terminals for high-speed communication, the connecting portions 21 are preferably surrounded over the entire periphery by the conductive portions 70.

Using a configuration in which the one or more connecting portions 21 of the signal terminal(s) 11 were surrounded over the entire periphery by the conductive portion(s) 70 as a model, an electric field distribution near the connecting portions 21 was simulated and shielding performance was evaluated. The electric field distribution was analyzed in cases where a frequency of a communication signal transmitted to the signal terminals 11 was 1 Ghz, 2.5 Ghz and 4 Ghz. As a result of the analysis, it was confirmed in any of the cases that the leakage of an electromagnetic field from the connecting portions 21 could be sufficiently suppressed by the conductive portion(s) 70. If the connecting portion(s) 21 particularly are surrounded over the entire periphery by the conductive portion(s) 70, it is thought to be possible to obtain shielding performance based on the Gigabit Ethernet standards, e.g. IEEE802.3ch.

The one or more conductive portions 70 particularly are formed of or comprise conductive rubber or conductive resin. Thus, the conductive portions 70 are resiliently deformed with the first regions 61*a* sandwiched between (particularly the end surfaces of) the shield portions 31 and the circuit board 90, whereby the conductive portions 70 are easily held in close contact with both the end surfaces of the shield portions 31 and the circuit board 90. By the close contact of the conductive portion(s) 70 with (the end surfaces of) the shield portions 31 and the circuit board 90, it is possible to suppress the leakage of noise through clearances between the conductive portions 70 and (the end surfaces of) the shield portions 31 and between the conductive portions 70 and the circuit board 90.

If the end surfaces of the shield portions 31 are directly held in contact with the circuit board 90 unlike this embodiment, the following trouble occurs. The shield portions 31 are made of metal. The shield portions 31 are hardly resiliently deformed. Further, the circuit board 90 may be warped in manufacturing. Thus, even if the end surfaces of the shield portions 31 are held in contact with the circuit board 90, tiny clearances are formed between the end surfaces of the shield portions 31 and the circuit board 90 and noise leaks through these clearances. It is considered to connect the shield portions 31 and the circuit board 90 by soldering to fill up these clearances, but solder connection is necessary.

In this embodiment, solder connection particularly is unnecessary since the conductive portions 70 are held in close contact with both (particularly the end surfaces of) the shield portions 31 and the circuit board 90 due to the resilient deformation of the conductive portions 70.

The one or more connecting portions 22 of the one or more ground terminals 12 particularly are arranged side by side with the connecting portion(s) 21 of the signal terminal(s) 11. The leakage of noise from the connecting portion(s) 21 of the signal terminal(s) 11 can be suppressed by the one or more ground terminals 12. In this embodiment, the connecting portions 22 of the ground terminals 12 particularly are arranged on both left and right sides of the connecting portions 21 of the signal terminals 11. The leakage of noise toward both left and right sides from the connecting portions 21 of the signal terminals 11 can be suppressed by the ground terminals 12.

By the one or more joining portions 66, the plate body 61 can be held on the housing 40 with the first region(s) 61*a* pressed against (particularly the end surface(s) of) the shield portion(s) 31. It is possible to maintain the state where the conductive portion(s) 70 and (the end surfaces of) the shield portion(s) 31 are held in close contact, suppress the formation of clearances between the conductive portion(s) 70 and (the end surfaces of) the shield portion(s) 31 and effectively suppress noise leaking through the clearances between the conductive portion(s) 70 and (the end surfaces of) the shield portion(s) 31.

Other Effects

The connector 1 and the board unit 100 of this embodiment particularly can connect the plurality of terminals 10 including the signal terminals 11 and the circuit board 90 without using solder. Since the terminals 10 particularly are press-fit terminals, the connecting portions 20 can be connected only by being press-fit into the through holes 92*h* of the circuit board 90.

The plurality of terminals 10 may not be press-fit terminals. In this case, solder connection may be performed after the connecting portions 20 are inserted into the through holes 92*h* of the circuit board 90.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector to be connected to a circuit board, comprising:
- at least one signal terminal;
- a shield portion for at least partly covering an outer periphery of an intermediate part of the signal terminal;
- a housing for holding and/or positioning the signal terminal; and
- at least one alignment plate to be joined to the housing, wherein:
- the signal terminal includes a first end part to be fixed to the housing and a second end part extending from the first end part substantially toward the circuit board,
- the second end part includes a connecting portion projecting from an end surface of the shield portion,
- the alignment plate includes a plate body to be arranged between the housing and the circuit board,
- the plate body has at least one first region formed with at least one positioning hole, the connecting portion being at least partly inserted into the positioning hole,
- the first region includes at least one conductive portion to be sandwiched between the end surface of the shield portion and the circuit board, the conductive portion at least partially surrounding the connecting portion.

2. The connector according to claim 1, wherein the conductive portion is formed of or comprises conductive rubber and/or conductive resin.

3. The connector according to claim 1, wherein the shield portion is substantially tubular.

4. The connector according to claim 1, wherein:
- the signal terminal is a terminal for high-speed communication of 1 Gbps or faster, and
- the conductive portion surrounds the connecting portion over an entire periphery.

5. The connector according to claim 1, comprising at least one ground terminal arranged substantially side by side with the signal terminal, wherein:

the ground terminal includes a first end part connected to the shield portion and a connecting portion projecting from the end surface of the shield portion substantially toward the circuit board.

6. The connector according to claim 1, wherein the signal terminal is a press-fit terminal.

7. The connector according to claim 1, comprising a dielectric between the signal terminal and the shield portion.

8. The connector according to claim 7, wherein:

the dielectric includes a projecting portion projecting from the end surface of the shield portion, and the projecting portion is to be at least partly inserted into the positioning hole.

9. The connector according to claim 1, comprising at least one joining portion for holding the plate body on the housing with the conductive portion pressed against the end surface of the shield portion.

10. A board unit, comprising:

the connector according to claim 1; and the circuit board.

* * * * *